T. Z. MERRITT.
FLOOR OR WALL SCREED.
APPLICATION FILED DEC. 29, 1916.
Reissued May 20, 1919. 14,652.
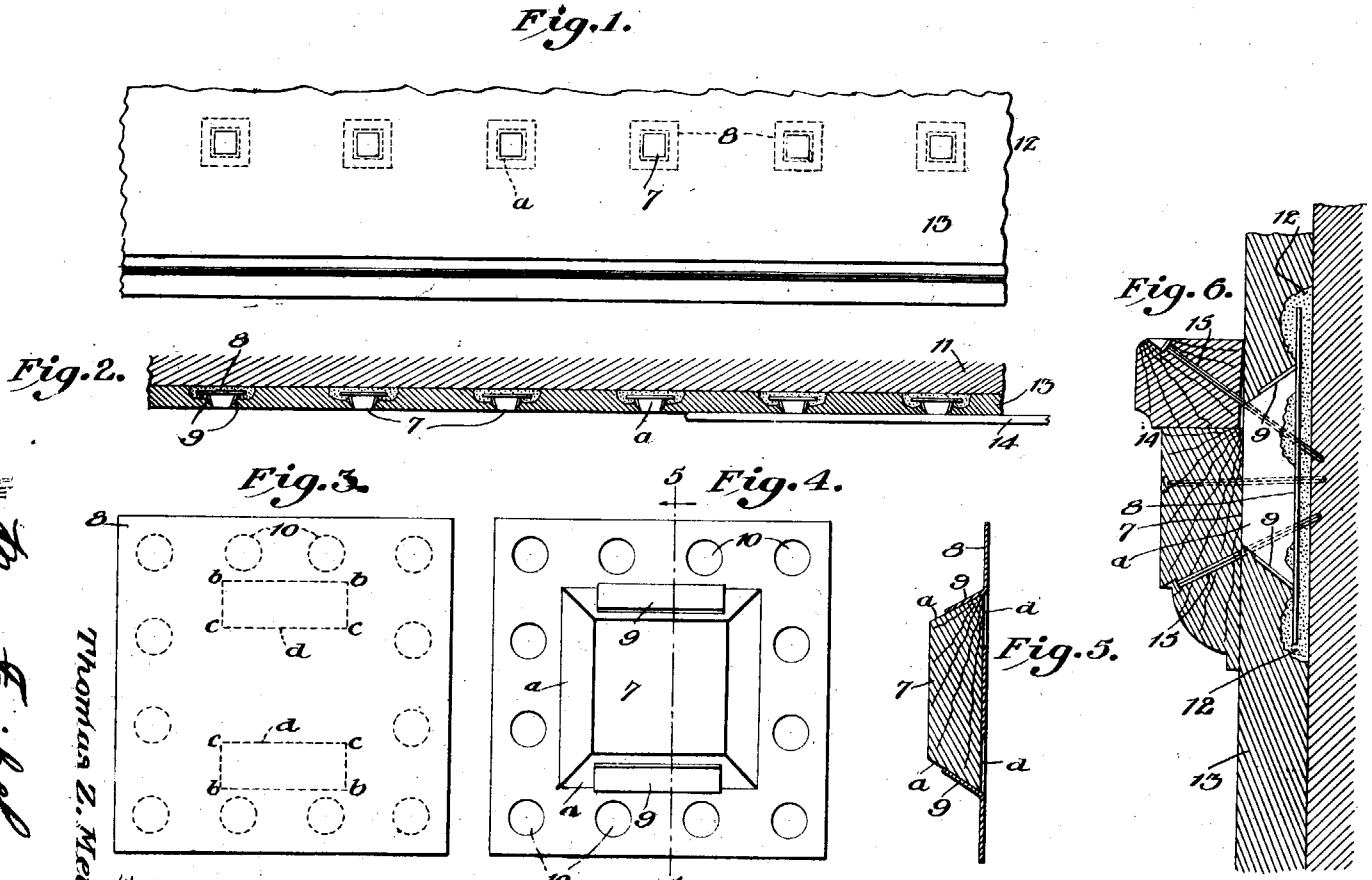
Inventor,
Thomas Z. Merritt
By Mason Fenwick & Lawrence,
Attorneys

UNITED STATES PATENT OFFICE.

THOMAS Z. MERRITT, OF OMAHA, NEBRASKA, ASSIGNOR, BY DIRECT AND MESNE ASSIGNMENTS, TO UNITED STATES SPOT GROUND CORPORATION, OF OMAHA, NEBRASKA, A CORPORATION.

FLOOR OR WALL SCREED.

14,652. Specification of Reissued Letters Patent. Reissued May 20, 1919.

Original No. 1,171,452, dated February 15, 1916, Serial No. 24,570, filed April 28, 1915. Application for reissue filed December 29, 1916. Serial No. 139,712.

*To all whom it may concern:*

Be it known that I, THOMAS Z. MERRITT, a citizen of the United States, residing at Omaha, in the county of Douglas and State of Nebraska, have invented certain new and useful Improvements in Floor or Wall Screeds, of which the following is a specification.

This invention relates to an improvement in a floor or wall screed, and has for its object, broadly, to provide screeds which will consist of few and simple parts so that manufacture will be convenient and economical, and which may be readily applied to the walls, partitions or floors of buildings without the use of nails or screws, for use as supports for wood or metallic casings, wall-strips or other like parts employed in finishing the interior of buildings.

The invention consists of the novel construction, combination and arrangement of parts as described herein and claimed, and as illustrated in the drawing, it being understood that changes in form, size, proportion and material may be made within the scope of the claims without departing from the spirit of the invention or sacrificing any of its advantages.

In the accompanying drawing, which forms a part of the application, Figure 1 is a broken away view showing a part of an upright wall or partition of a building with the screeds mounted therein. Fig. 2 is a plan view showing a part of a wall or partition with the screeds mounted therein, the view being in transverse section, a portion of a wall-strip being added. Fig. 3 is a diagrammatic view showing a metallic sheet or plate used as a holder for the block or pillow. Fig. 4 is a front view showing the block or pillow mounted upon the plate. Fig. 5 is a transverse section on line 5—5 of Fig. 4. Fig. 6 is a view showing the screed applied to a building wall or partition, as a support for a wall-strip or casing, said strip or casing, the plaster and wall or partition being in section.

Referring now to the drawing for a more particular description, numeral 7 indicates a block or pillow which may be constructed of wood, metal or any other suitable material adapted to operate as a support and as a retainer for nails or screws. It is preferably of rectangular form, of uniform thickness, and each of its sides is inclined inwardly from the back to the front, and thereby providing the inclined facets *a*.

Numeral 8 indicates a rectangular metallic plate which may be incised on parallel lines *b c* and lines *c c*, the parts between said lines being bent outwardly on lines *b b*, inwardly of two opposed edges, to form recesses *d* (Fig. 5) and to form the flanges or clasps 9, their inclination with reference to the plate corresponding to the shape or inclination of the facets *a* of the block 7, and the plate is provided, near its edges with apertures 10, the remaining part of the plate or that part between the flanges and recesses *d* preferably being imperforate. The block is disposed on the imperforate part of the plate above recesses *d* with two of its inclined sides embraced by the flanges or clasps 9 which operate to maintain the block between the rows of apertures 10.

In operation, the screed is attached to the wall 11 by the use of plaster of Paris 12 or other adhesive material by pressing the plate 8 against the wall, the plastic adhesive being compressed between the wall and said plate so that it will, in part, move forwardly through the apertures *d* and 10, said adhesive engaging and adhering to the rear face of the block 7 where it passes through the apertures *d* and engaging the inclined surfaces *a*, after passing through the apertures 10, so that in addition to the block 7 being held in operative position by the flanges 9 and as an auxiliary and independent fastening means the said block 7 is held in operative position by the actual physical engagement of the plastic adhesive to the block itself. The engagement of the adhesive with the block 7 is shown more particularly at Fig. 6. If plaster of Paris is used it will soon become dry and firm and the device will be securely held to the wall.

The screeds may be disposed in alinement as shown in Figs 1 and 2, their thickness being substantially equal to the plaster 13 which is then applied to the wall. Since the area in plan of the plate is greater than that of the block, the plaster will cover a considerable part of the plate, and will also, in conjunction with the plastic adhesive, cover the inclined sides of the blocks so that they will be firmly held by the combined action of the adhesive and the plaster. As shown in Figs. 2 and 6, a rail, wall-strip, or casing 14 may be secured to the screeds by keepers 15, and the screeds provide an adequate support therefor.

Among some of the advantages to be derived by use of the screeds it may be stated that, where brick, stone, tile or cement are used for the walls or partitions, the conventional channels or recesses usually provided therein for containing anchor-blocks or strips may be dispensed with, which results in a saving of time and labor. Also the parts employed in constructing the screeds are few, and they may be manufactured conveniently at, comparatively, a limited cost.

Having fully described the construction and function of the parts, a further explanation relating to operation is not necessary.

What I claim and desire to secure by Letters Patent is:—

1. In concrete or similar floor or wall construction, the combination with a support, adhesive portions disposed at spaced intervals in horizontal alinement on the support, a plurality of plates having the entire areas of their inner sides formed rectilinear and mounted on said adhesive portions, each being provided on its outer side with a pair of transversely inclined flanges extending parallel in one direction, said plates being formed outwardly of said flanges with apertures to permit a passage therethrough of a part of said adhesive portions, a plurality of fiber-blocks each being disposed upon a plate between the flanges thereof, and a layer of plastic material surrounding said blocks and leaving a part of each block exposed.

2. As an article of manufacture, a plate of material having inclined abutments standing out from one side, and a penetrable block having inclined sides complementary to and retained by and extending beyond the inclined abutments.

3. An article of manufacture comprising a plate having an area provided with flanges upon opposite sides inclined toward each other, and a block of penetrable material occupying the area and engaged and held by the flanges, with its rear side substantially flush with the plate and its front side extending beyond the flanges.

4. A floor or wall screed comprising a penetrable block having inclined sides adapted to be engaged by an adhesive and secured to a wall thereby, said block being of a thickness to correspond to the plaster coat to be applied to the wall.

5. An article of manufacture comprising a plate of material having perforations formed therethrough, abutments struck up from the material and extending above one side, a block of penetrable material, said abutments being inclined inwardly and clamped upon said block of penetrable material, said block extending beyond the abutments.

6. An article of manufacture comprising a plate having perforations therethrough adapted to permit the passage of a plastic cement to secure the plate to a wall, a penetrable block placed upon the plate opposite the wall side, and lips upstanding from the plate and bent into engagement with the sides of the penetrable block.

7. A floor or wall screed comprising a perforated plate and a penetrable block secured thereto, an adhesive material adapted to be secured to the floor or wall to which the device is to be applied, portions of said adhesive material being adapted to enter the perforations in the plate to secure the device in place.

8. In a floor or wall construction, a plurality of floor or wall screeds, each of which comprises a perforated plate and a penetrable block secured thereto, a plurality of spots of an adhesive material adapted to be secured to the floor or wall to which the devices are to be applied, said devices being adapted to be placed on the floor or wall over the adhesive spots in alinement with one another, said devices being placed in alinement while said adhesive material is in a soft condition whereby said adhesive enters the perforations in the plate to secure the devices in place.

9. In a floor or wall construction, the combination with a support, adhesive portions placed on said support in desired alinement, a plurality of perforated plates with penetrable blocks secured thereto, placed over said adhesive portions in desired alinement, the adhesive portions being situated between the rear face of each of the plates and the support, with portions of said adhesive material extending through the perforations in the plates to support the same.

10. In a floor or wall construction, a plurality of floor or wall screeds, each of which comprises a plurality of spots of adhesive material arranged in alinement, and a like number of perforated plates with penetrable blocks secured thereto placed over said adhesive portions in desired alinement, and forced against said adhesive portions until sufficient of said adhesive material has passed through, and around and beyond said plates so that the faces of the blocks shall lie in the same plane.

11. The combination with a supporting structure, of a plurality of spaced anchoring plates secured thereto by adhesive material applied to their rear faces, nail-receiving means supported by said plates and projecting outwardly from their front faces, said plates projecting laterally beyond said nail-receiving means and formed in such projecting portions with apertures permitting the protrusion of keys of said adhesive material, and a plaster coat applied to said structure and submerging said plates and embracing said nail-receiving means and interlocked with said keys.

12. In concrete or similar floor or wall construction, the combination with a supporting structure, cementitious masses disposed at spaced intervals on the face of such structure, a plurality of plates mounted one on each of said adhesive masses, each plate being provided on its outer face with a pair of parallel flanges and being formed outwardly of said flanges with apertures to permit the passage therethrough of a part of said adhesive material, and a wood member held between said flanges.

13. A ground comprising a plate provided with perforations, in combination with adhesive material engaging in said perforations whereby it may be stuck to the face of a previously built wall, and a wood block attached to the plate and projecting from the face thereof a distance approximately equal to the thickness of a plastic coat.

14. A ground comprising a metal plate having means to receive keys of adhesive material, whereby it may be stuck to a wall, flanges struck up from said plate between the said means, and a wooden block held between said flanges.

15. The combination with a supporting structure, of a metal anchoring plate having means for receiving keys of cementitious material interposed between said plate and the face of the structure and bonded to said structure by a mass of such material interposed between said plate and the face of said structure, a wood member carried by said plate and projecting beyond the outer face thereof, and other cementitious material submerging said plate and embracing said wood member.

16. The combination with a supporting structure, of a flat metal plate, a wood member carried by said plate and projecting beyond the outer face thereof, said plate projecting laterally farther than said member and having apertures therein for the passage of plastic adhesive material applied to said structure and extending through said apertures, and a plaster coat applied to said structure and submerging said plate and embracing said wood member.

17. The combination with a supporting structure of a plurality of spaced anchoring metal plates secured thereto by adhesive material applied to the supporting structure, and nail-receiving means supported by said plates and projecting beyond their front faces, said plates projecting laterally beyond said nail-receiving means, and having means in such projecting portions for the reception of keys of said adhesive material.

18. The combination with a supporting structure, and a plaster coat thereon, of a ground device affixed to the face of said structure and penetrating said plaster coat, said device comprising a base portion having at the rear face thereof means for receiving keys of plastic cementitious material and a nail-receiving portion narrower than the base portion and rigid therewith, and a mass of cementitious material interposed between the surface of said supporting structure and the rear of said base portion and having keys interlocked with said means, said plaster coat submerging said base portion and embracing said nail-receiving portion and having its surface substantially flush with the outer face of said nail-receiving portion.

19. The combination with a supporting structure, of a ground device having an attaching or base portion and a nail-receiving portion, plastic adhesive material such as plaster of Paris interposed between the rear face of said portion and the surface of said supporting structure, said base portion being formed with key-receiving means and the plastic mass having integral keys interlocked with said means, and a plaster coat applied to said supporting structure and embracing said nail-receiving portion, said plaster coat also submerging said base portion and being attached to said keys.

20. The combination with a supporting structure of a ground device, having a front nail-receiving part and a key-receiving part having recesses in its rear face, a mass of cementitious material interposed between the rear face of said key-receiving part and the face of said supporting structure and having integral keys interlocking with said key-receiving recesses, to fasten the ground device to said face, and a plaster coat adhering to said supporting structure and submerging said key-receiving part and embracing said nail-receiving part, the face of said last part being substantially flush with the surface of the plaster coat.

In testimony whereof I affix my signature.

THOMAS Z. MERRITT.